United States Patent [19]

Stansfield et al.

[11] Patent Number: 5,299,014
[45] Date of Patent: Mar. 29, 1994

[54] TELECINE METHOD AND APPARATUS FOR THE PRODUCTION OF HIGH DEFINITION TELEVISION SIGNALS

[75] Inventors: Peter W. Stansfield, Hatfield; Trevor M. Osborne, Arksey, both of Great Britain

[73] Assignee: Rank Cintel Ltd., England

[21] Appl. No.: 6,140

[22] Filed: Jan. 19, 1993

Related U.S. Application Data

[63] Continuation of Ser. No. 675,147, Mar. 26, 1991, abandoned.

[30] Foreign Application Priority Data

Mar. 30, 1990 [GB] United Kingdom ............... 9007249

[51] Int. Cl.⁵ ............................................. H04N 5/253
[52] U.S. Cl. ................................. 348/100; 348/108; 348/469
[58] Field of Search .............. 358/214, 215, 216, 54, 358/75, 80, 11, 12, 146, 213.28, 140, 345, 346; H04N 5/253, 3/36, 7/00

[56] References Cited

U.S. PATENT DOCUMENTS

| | | | |
|---|---|---|---|
| 2,892,015 | 6/1959 | Jones | 358/15 |
| 4,168,509 | 9/1979 | Hartman | 358/138 |
| 4,191,972 | 3/1980 | Matchell | 358/214 |
| 4,771,471 | 9/1988 | Kitamura | 382/41 |
| 4,794,456 | 12/1988 | Tsinberg | 358/141 |
| 4,809,345 | 2/1989 | Tabata et al. | 382/47 |
| 4,900,130 | 2/1990 | Haas | 350/321 |
| 4,903,131 | 2/1990 | Lingemann et al. | 358/214 |
| 5,045,932 | 9/1991 | Sharman et al. | 358/76 |

FOREIGN PATENT DOCUMENTS

| | | | |
|---|---|---|---|
| 2841534 | 4/1979 | Fed. Rep. of Germany | H04N 3/36 |
| 2240232 | 7/1991 | United Kingdom | H04N 7/01 |

Primary Examiner—Joseph Mancuso
Assistant Examiner—Tuan V. Ho
Attorney, Agent, or Firm—Ostrolenk, Faber, Gerb & Soffen

[57] ABSTRACT

A high definition video signal can be obtained from photographic film by a non-real time scanning operation. The image area to be scanned is divided into blocks and a number of subscans equal to the number of pixels in each block are performed on the image area. In each scan, a different pixel in each block is scanned so that after n scans all pixels in the n pixel blocks have been scanned and a composite video signal can be formed. A plurality of high definition frames are stored at less than real time in a multi-frame store and then read out in real time to give a continuous high definition playback.

6 Claims, 3 Drawing Sheets

TELECINE METHOD AND APPARATUS FOR THE PRODUCTION OF HIGH DEFINITION TELEVISION SIGNALS

This is a continuation of U.S. Ser. No. 07/675,147, filed on Mar. 26, 1991, now abandoned.

This invention relates to telecine machines and is particularly related to the production of high definition video signals from photographic film.

With the advent of high definition television there is a need to produce a telecine which can produce video signals of high definition quality. Existing telecines, for example the applicant's URSA digital flying spot telecine, produce signals with 720×576 active pixels per image frame, to produce a 4:3 aspect ratio standard definition picture. A high definition machine operation at the same frame rate (50 fps) and with an aspect ratio of 16:9 would require 1920×1152 active pixels. This requirement represents an increase in data rate from 18 Mpx (Million pixels per second) to 72 Mpx, a fourfold increase.

Increasing the data rate of the URSA machine would be technically difficult, complicated and expensive. Moreover, the increase in data rate necessitated by the increased sampling rate required for HDTV would exaggerate the effects of CRT afterglow. A substantial increase in high frequency boost applied to the signal would be required to correct these unwanted effects and that increase would, in turn, unacceptably decrease the machine's signal-to-noise ratio. A further decrease in S/N ratio would be experienced as the increased sample period decreases the signal integration period, increasing noise.

We have appreciated that rather than trying to overcome the problems mentioned above in real time, existing telecine machines can be adapted to produce high definition signals in Non Real Time (NRT). Film is scanned in non real time and then upconverted to true film rate.

According to a first aspect of the invention a non-real time multi-scanning technique is employed to obtain a high definition scan. Each frame of film is scanned a number of times, for example four, with the scan being offset before each pass. In this way a full resolution scan is made up from a number of lower resolution scans. More specifically, there is provided a method of scanning photographic film to obtain a high definition video signal, comprising dividing the area to be scanned into a plurality of blocks, each comprising n pixels, scanning the image area with a cathode ray tube (CRT) raster to acquire image data from a first pixel within each block, adjusting the scan, and rescanning the image, the adjustment being such that upon rescanning, image data is acquired from an unscanned pixel of each block, repeating the adjustment and rescanning until the image area has been scanned n times, and combining the image data acquired from each scan to form a composite high definition image.

The scanning method embodying the invention has the advantage that the scanning rate remains the same as that of real time standard definition telecine. However, the output frame rate is reduced by a factor n, where n is the number of pixels in each block and so corresponds to the number of scans made to acquire one high definition output frame.

Preferably, the number of pixels in each block is four or six. Moreover it is preferred that a block extends over at least two scanning lines and that the pixel of a given block scanned by the second and subsequent scans is on a different scanning line from the pixel scanned by the previous scan.

The invention also extends to a scanner for scanning film to obtain a high definition video signal.

In a second aspect of the invention segments of real time high definition video signal are obtained by non-real time scanning of a film. More specifically, there is provided a method of obtaining high definition video signals from photographic film comprising scanning film frames to output high definition video frames at a rate less than real time output rate, storing the high definition video frames in a multi-frame store, and, on filling of the multi-frame store with video frames, reading a continuous stream of high definition video data.

The use of a multi-frame store enables segments, for example 20-30 seconds, of continuous high definition video signal to be recorded from a non-real time scanning process.

In a preferred embodiment, high definition video data read from the multi-frame store is recorded on a high definition recording medium, the multi-frame store is then filled again and the next segment of high definition video signal is transferred onto the recording medium. In this way, a complete film can be transferred onto a high definition recording medium in a manner which allows real-time play back.

Embodiments of the invention will now be described, by way of example, and with reference to the accompanying drawings, in which.

Figure 1:
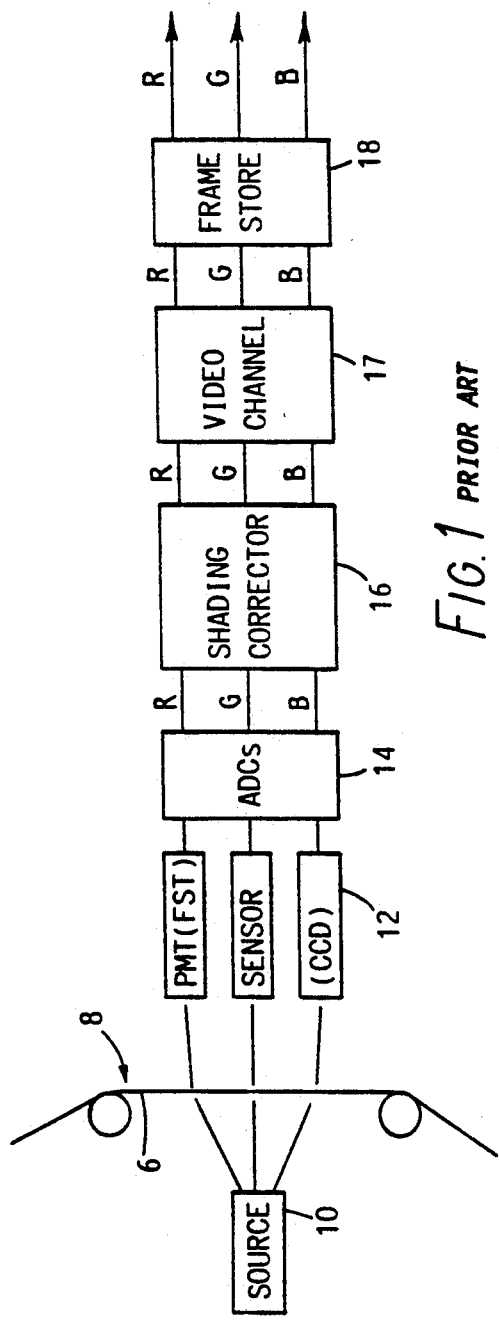
FIG. 1 is a block diagram of the major components of a digital flying spot system.

The telecine shown in FIG. 1 comprises the following major components. The scanner and source 10 which may be a high power cathode ray tube (flying spot telecine) or a quartz-halogen bulb (CCD telecine). In flying spot telecine the electron beam produced by the CRT scans the exposed film 6 in the film gate 8 and photomultiplier tubes 12 to detect red, green and blue light transmitted through the film. In the case of CCD telecine the light source illuminates a strip of film and an array of CCD sensors 12 detects the light transmitted through the film. The detected light which is in the form of red, green and blue signals, RGB, is converted into 14 bit digital signals A to D converters 14 and processed by the shading corrector 16 which compensates the signals for machine defects. In CCD machines there may be differences in sensitivities of individual sensor elements. In flying spot machines these defects may be due to burn on the CRT face or differences in response of phosphor grains across the CRT face. In both cases dirt on the film may be compensated for. Shading corrections are described more fully in our copending application WO/9007842.

After shading corrections have been applied, the video signal is processed in the video channel 17. At this stage further corrections are applied, for example to compensate for CRT afterglow and to control colour balance. As many of the corrections are applied on a frame by frame or scene by scene basis it is usual to store the various corrections on a preprogrammer which controls operation of the telecine when actual film to video transfer takes place. The video signal output from the video channel is passed to a frame store 18 and then to a VTR and/or a monitor.

As mentioned previously, we have appreciated that high definition telecine may best be achieved through non-real time (NRT) operation. Of course, a high definition scan must be used which may be done in a number of ways.

Figure 2:
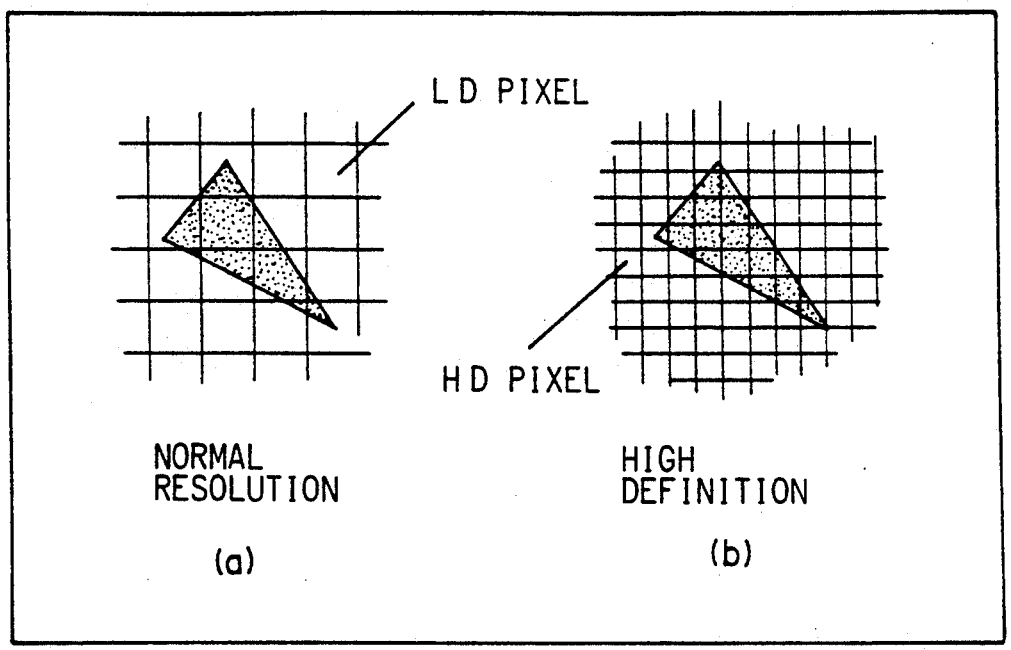
FIG. 2 is a diagram illustrating the increased resolution required for high definition scanning.

Firstly, the pixel resolution of the existing standard definition scan may be increased. The generation of a scanning map is described in our copending application WO/9007842 and this technique would require the resolution of the map to be increased in both the X and Y axes. With such a technique all the pixels in the high definition scan are covered in a single, continuous scan. As can be appreciated from the comparison of resolutions and pixel sizes shown in FIGS. 2a and 2b, the high definition scan will be some 4 to 5 times longer than the standard real time scan at present employed.

Figure 3:
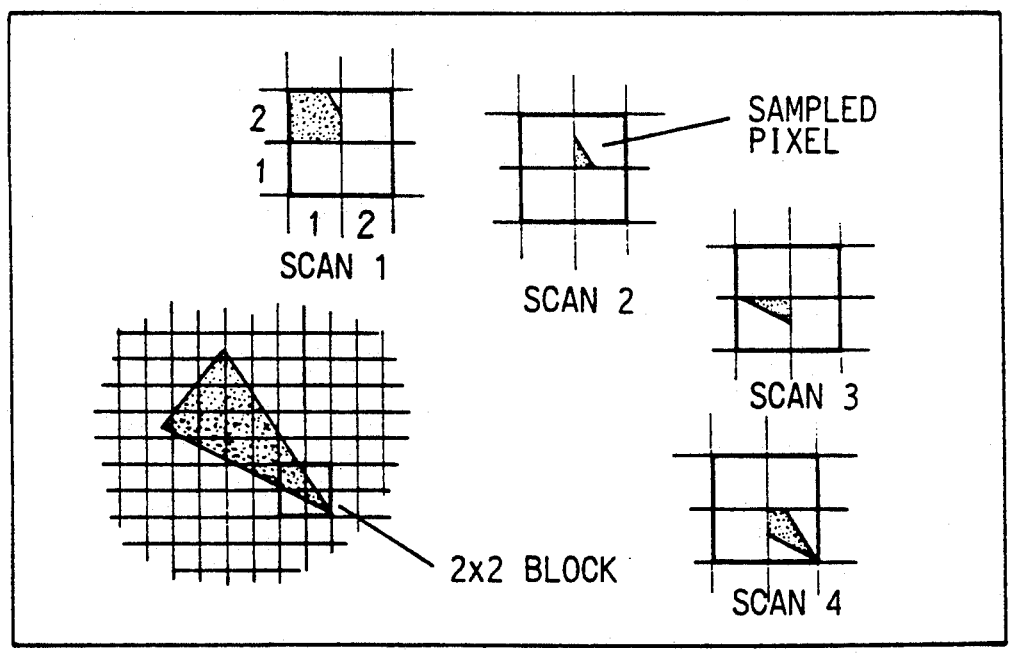
FIG. 3 is an illustration of a method of producing a high definition scan.

FIG. 3 shows an alternative scanning technique in which each frame is scanned more than once at a reduced resolution to build up a high resolution image. The image area is treated as a series of blocks, each of, for example, 2×2 or 3×2 pixels. Each scan contributes one pixel from the block. As shown in FIG. 3, the first scan contributes the pixel (1,2), the second scan pixel (2,2), the third (1,1) and the fourth (2,1).

As each of the scans takes data from a different subset of pixels, when the pattern of scans is completed all the image pixels will have been covered. The scanning rate is the same as that for standard definition telecine but the output frame rate is reduced by a factor of four to six depending on block size.

Figure 4:
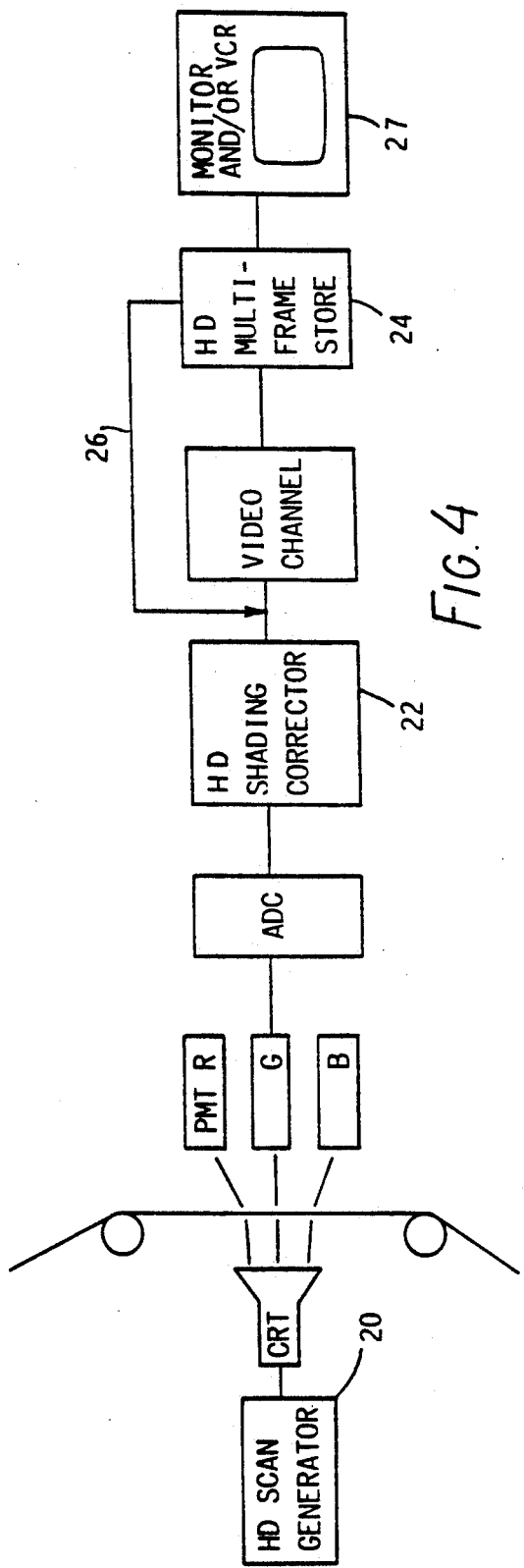
FIG. 4 is a block diagram of a telecine modified to embody the invention and operate in non-real time.

Referring now to FIG. 4, the basic components required for an HD telecine are shown. Only the differences from the system of FIG. 1 will be described. The telecine shown is a flying spot telecine and, as mentioned, a high definition scan generator 20 is required to control the CRT. Similarly high definition shading corrections 22 are required to cope with the increased number of pixels in the image scan. The important addition is a high definition multi-frame store 24 which receives the video data whichever of the scanning methods has been employed. The multi-frame store 24 can hold a number of video frames and a large size device can hold up to 20 seconds of HD data. Thus, a real time output form the frame store is available in high definition although for a short period only.

The existing telecine machines convert colour information into 14 bit digital signals but subsequently reduced these to 8 bits signals by the framestore. With HD telecine the multi-frame store 24 stores the HD data as 14 bit signals which allows regrading of the high definition data in the store (illustrated by recursive loop 26 in FIG. 4).

Alternatively, grading may be performed in standard definition real time in the same way as with existing telecines and then processing takes place in high definition, non-real time on request. Such a machine would, of course, be capable of operating in either standard or high definition modes.

Figure 5:
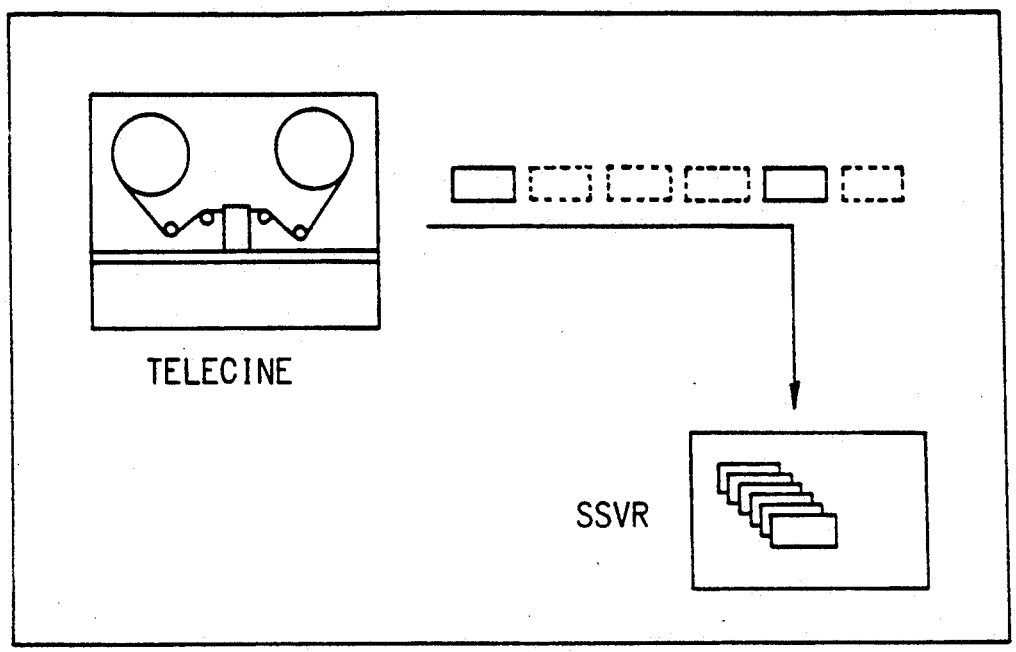
FIG. 5 is a schematic diagram showing the first stage in a method of frame rate upconversion.
Figure 6:
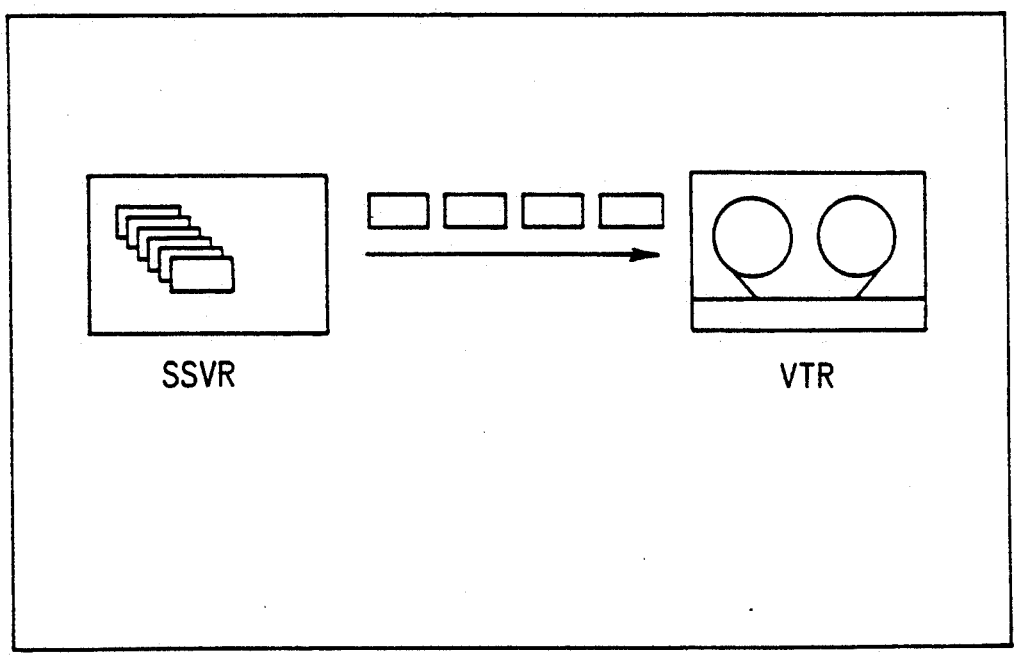
FIG. 6 is a schematic diagram showing a second stage in the method of FIG. 5.

FIGS. 5 and 6 illustrate how the high definition multi-frame store may be implemented. Under NRT operating conditions the digital output from the telecine would be to normal high definition format, but with true picture information in one out of four frames (assuming a multiple scan using a block size of 2×2 pixels). The intermediate frames would be either wholly invalid or a repeat of old data.

The multi-frame store may conveniently be a solid state video recorder SSVR which converts the NRT data into a continuous real time stream for recording on a conventional high definition video recorder illustrated at 27 in FIG. 4. The process is two stage in which, as shown in FIG. 5, valid frames are selectively written into the SSVR 24 and invalid frames discarded.

Once the SSVR is full, typically after 20–30 seconds, the writing of data from the telecine is suspended and the second stage, illustrated in FIG. 6, is commenced. In this stage, stored valid frames are output end to end in a continuous stream to the VTR, the output being in real time. Because of the limited storage capacity of the SSVR, it will generally be necessary to repeat this process many times when transferring all but the shortest of films. However, the entire NRT transfer can be performed automatically under control of the telecine with no operator intervention once the transfer is initiated, other than roll changes on long films.

The transfer sequence is therefore as follows:
1. Non-real time transfer of 20 second film section to SSVR multi-frame store;
2. Cue VTR to roll-up point matching end of previous section of film;
3. Real time transfer of data from SSVR to VTR;
4. Return to step 1 and repeat.

The capacity of the SSVR could be increased by interposing an image compressor between the output of the video channel and the SSVR. This has the advantage that a greater length of HD data can be stored for a given size of device. Between the SSVR and VTR is disposed a corresponding image decompressor or expander which restores the image. Discrete cosine transformation or Huffman coding could be used in the compressor and expander.

Preview operation may be obtained in a number of different ways. For example, a continuous scan or standard definition may be used, together with a 16:9 aspect ratio. An interpolator or pixel doubler is then used to fill gaps between the lines and pixels to give an HD format output. Of course the resolution would still be standard resolution but no motion smearing would be experienced.

Alternatively, where the multi-scan technique is used, the film could be moved between each scan, approximating the usual standard definition operation. When fed through a pixel combiner this produces HD frames at full speed and full resolution but is subject to blurring or smearing. Where motion is involved as the image is composed of information from a number of film frames.

Smearing may be reduced by incorporating a motion detector into the device. Then, significant changes in a pixel between scans, all pixels in the block containing that pixel will adopt the value of the new pixel. This will reduce resolution of the areas of the image containing motion but will provide a frame-by-frame update to avoid smearing.

We claim:

1. A method of scanning photographic or cinematographic film to obtain a high definition video signal, comprising the steps of:

(a) dividing the image area of a flying spot scanner into a plurality of blocks, each of said blocks comprising n pixels;

(b) scanning a first frame of said film by scanning the image area with a cathode ray tube (CRT) raster of said scanner to acquire image data from a first of said pixels of each of said blocks;

(c) adjusting the position of said CRT raster with respect to said image area;

(d) rescanning the image area, the adjusting of said CRT raster being such that said rescanning of the image area acquires image data from an unscanned pixel of said n pixels of each block of said image area;

(e) repeating said adjustment and rescanning until the image area has been scanned n times;

(f) combining the image data acquired from each scan to form a composite non-real time high definition video signal representative of the image stored on said first frame of film; and (g) repeating steps (b) to (f) for second and subsequent frames of film.

2. A method according to claim 1, wherein each block extends over at least two scanning lines and the pixel of each block scanned during the second and subsequent scans is on a different scanning line from the pixel scanned by the previous scan.

3. A method according to claim 1, wherein the scan is adjusted by offsetting the scan pattern.

4. A method according to claim 1, wherein each block contains 4 pixels and extends over 2 scanning lines.

5. A method according to claim 1, wherein each block contains 6 pixels and extends over 2 scanning lines.

6. Apparatus for scanning photographic or cinematographic film to obtain a high definition video signal, comprising:

a flying spot scanner for scanning frames of said film, said scanner having a cathode ray tube (CRT) raster; said scanner further comprising:

means for dividing the image area to be scanned into a plurality of blocks, each of said blocks comprising n pixels;

means for scanning frames of said film by scanning said image area for each frame with said CRT raster to acquire image data from a first of said pixels of each of said blocks;

adjustment means for adjusting the position of said CRT raster with respect to said image area;

means for rescanning the image area for each frame of film with said CRT raster adjusted by said adjustment means such that on rescanning of the image area image data is acquired from an unscanned pixel of said n pixels of each block of said image area;

means for repeating said adjustment and rescanning for each frame of film until the image area has been scanned n times; and means for combining the image area acquired from each scan to form a composite non-real time high definition video signal representative of the image stored on said frame of film.

* * * * *